April 13, 1965   L. S. WIRT   3,177,972
SOUND ABSORBING GAS TURBINE EXHAUST DUCT
Filed Dec. 14, 1960
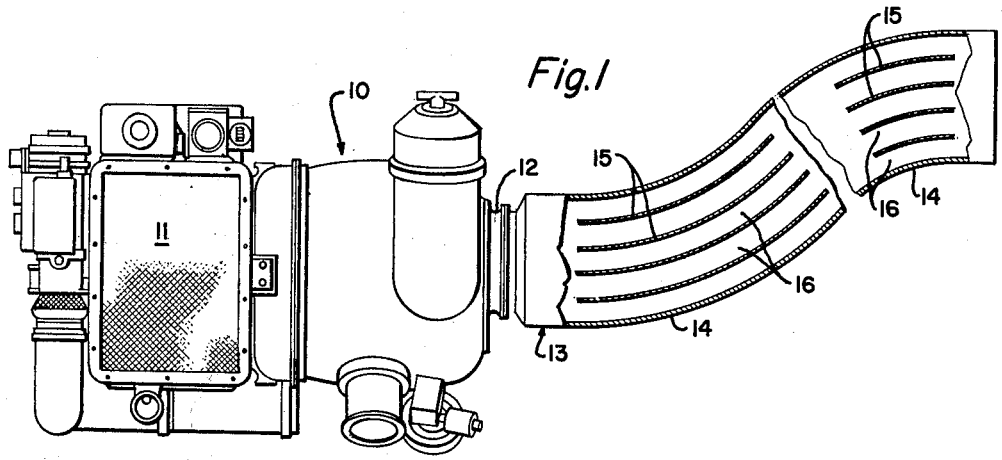
Fig.1
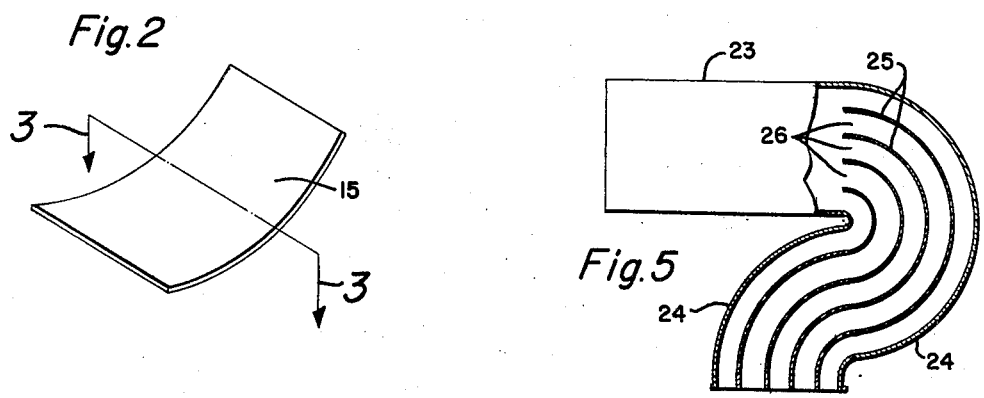
Fig.2
Fig.5
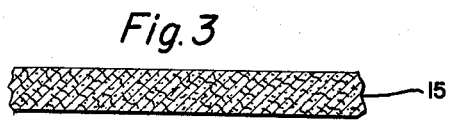
Fig.3
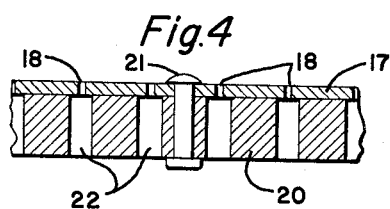
Fig.4
INVENTOR
LESLIE S. WIRT
BY
*Francis H. Beter*
ATTORNEY

United States Patent Office 3,177,972
Patented Apr. 13, 1965

3,177,972
SOUND ABSORBING GAS TURBINE
EXHAUST DUCT
Leslie S. Wirt, Phoenix, Ariz., assignor to The Garrett Corporation, Los Angeles, Calif., a corporation of California
Filed Dec. 14, 1960, Ser. No. 75,751
8 Claims. (Cl. 181—56)

This invention relates to exhaust ducts for absorbing sound, and more particularly to a curved exhaust duct having sound attenuating properties for reducing the noise produced by a gas turbine.

When attempts have been made in the past to reduce the noise of a gas turbine engine, fibrous materials have been employed in the exhaust ducts. Aside from the fact that such materials are bulky and may require more room than is available, they have been found to absorb sufficient fuel to constitute an unusual fire and explosion hazard when used with gas turbines where there is the possibility of slow or faulty starting. Thus, prior sound deadening devices for gas turbines have been unsatisfactory both from the standpoint of the space required to house them and because of the fuel absorbing characteristics of the materials used in making them.

It is an object of this invention to provide an improved sound attenuating exhaust duct for gas turbines which obviates the difficulties of prior devices for this purpose.

Another object is to provide an exhaust duct for gas turbines which is adapted to deaden the sound produced by such turbines and includes at least one vane for dividing the exhaust stream and properly controlling the velocity profile of the gases, the vane being constructed of a thin sheet of slightly porous metal.

Another object is to provide an exhaust duct for gas turbines which is adapted to deaden the sound produced by such turbines and includes at least one vane for dividing the exhaust stream and properly controlling the velocity profile of the gases, the vane being constructed of a thin sheet of slightly porous metal having a viscous flow resistance of between 15 and 300 rayls.

Still another object of this invention is to provide a sound attenuating exhaust duct for gas turbines, said duct having a curved portion therein and a plurality of thin, slightly porous, stainless steel vanes in such curved portion of the duct which form a plurality of sound absorbing passages in said duct.

A further object of the invention is to provide a vane for use in a curved exhaust duct, said vane consisting of a thin sheet of slightly porous metal and being curved throughout its length for dividing said duct into a plurality of curved passages and controlling the velocity profile of the exhaust gases flowing therethrough.

The above and other objects of the invention will be apparent from the following description and the accompanying drawing, in which:

FIG. 1 is a plan view, partially schematic, of a gas turbine having an exhaust duct embodying the principles of this invention;

FIG. 2 is a perspective view of one of the vanes used in the duct shown in FIG. 1;

FIG. 3 is a somewhat enlarged cross-sectional view, on the line 3—3 of FIG. 2 showing one type of material used in making the vane;

FIG. 4 is an enlarged cross-sectional view, similar to FIG. 3, showing a different material and form of construction for the vanes; and FIG. 5 is a plan view, with portions broken away and in section, of a modified form of exhaust duct.

Referring now to FIG. 1, a combination gas turbine and compressor 10, having an inlet 11 and exhaust outlet 12, is shown provided with a special exhaust duct which is designated generally by the reference numeral 13 and embodies the features of this invention. In the starting and operation of a gas turbine, the gases develop high velocity and pressure in passing through the compressor, and after combustion in the turbine the exhaust gases issue from the outlet 12 with a considerable amount of noise. While there are some applications of gas turbines where the noise of operation presents no problems, there are many uses and locations of operation where the noise produced is considered objectionable. Consequently, attempts have been made to reduce and eliminate the noise and such attempts have presented certain troublesome operating problems.

In normal acoustical practice, noise may be eliminated or reduced by conducting the vibrating sound waves into a chamber or through a circuitous duct in which such waves may be absorbed. The usual method of absorbing sound is to provide some form of fibrous sound absorbing material on or immediately adjacent to the walls of the duct or chamber. Depending on the conditions of installation, the fibrous material may be provided in relatively thick layers on top of a smooth wall surface or on the exposed surfaces of a baffle in the duct or chamber; or somewhat thinner layers may be effectively used if a closed air space can be provided behind them. The application of these principles and techniques to the exhaust of a gas turbine has presented difficulties. For example: there are many situations where there is insufficient room for the sound chamber or circuitous duct, and in addition, any such sound chamber or other closed space unless properly drained will pocket liquid fuel. If a circuitous or otherwise curved path is available for a duct, the gases tend to pile up on the concave portion of the curve and create objectionable turbulence and back pressure. Moreover, when the normal acoustical fibrous materials are used, either on the surfaces of duct walls or baffles, such materials may become saturated with excess fuel present in the exhaust stream during delayed ignition or slow starting. Then, when the engine lights and hot oxygen-rich exhaust gases are forced under pressure into the fuel-saturated fibrous material, a sufficiently hot fire may be created to burn out the entire exhaust system. Obviously such a fire could also completely destroy any vehicle in which the gas turbine and exhaust were installed.

According to the present invention, the foregoing difficulties are eliminated and an effective sound attenuating exhaust duct is provided by including curves or turns in the duct and having vanes in the curved portions constructed of thin, slightly porous sheet metal or alloy, such as stainless steel sheet. The use of vanes in the curves is important in order to avoid back pressure, reduce turbulence, and otherwise distribute and lead the exhaust stream through the curved path and properly control the velocity profile and pressure distribution of the exhaust gases; and by having the vanes themselves slightly porous, a plurality of sound absorbing passages are provided.

To maintain turbulence at a minimum while properly controlling the velocity profile of the gases as their direction is changed in the curve of the duct, the concave surfaces of the vanes should preferably be smooth, since in high velocity flow through a curved passage some noise may be generated. It will be understood that the smooth concave surface of the vane is the zone of highest pressure as the exhaust gases push up against such surface, and the opposite convex side will be a zone of lower pressure so that a pressure differential is created which will cause a portion of the gases to flow through the slightly porous material. The slight porosity of the thin sheet metal should be such as to produce the required flow resistance therethrough into the air space provided by the passages adjacent the vanes and thereby produce effective sound absorption. Experiment has shown that the physical characteristics of the vanes will provide an acoustical optimum when 50% of the noise striking a surface of a vane is absorbed, 25% is reflected and the remaining 25% is transmitted through the vane. It has been found that the specific flow resistance of the slightly porous sheet metal should be above 15 rayls and below 300 rayls. (The rayl is the acoustical unit of viscous flow resistance; and one rayl is the resistance of a medium when a pressure differential of one dyne per square centimeter, applied across said medium, produces a volume flow through said medium of one cubic centimeter per second per square centimeter of surface.) When the curve of the duct and vane is very abrupt and/or the flow velocity high, a suitable flow resistance of the slightly porous sheet metal is about 200 rayls. If the design of the duct employs more gentle curves, such as shown in FIG. 1, the flow resistance may be less than this amount; and a resistance of about 100 rayls produces the most effective sound attenuation and represents an acoustical optimum. Where such flow resistance is obtained in slightly porous sheet metal, however, there will still be no undesirable or dangerous accumulation of liquid fuel during faulty starting of the gas turbine, as explained above.

It will be apparent that the material used in making the vanes is of primary importance, since it is required to have a slight porosity that will provide the desired flow resistance of between 15 and 300 rayls. It has been found that thin, microporous stainless steel, such as is made by powder metallurgy techniques and used in chemical filtration, is suitable for the practice of this invention; or the new slightly porous stainless steel sheet made by felting, sintering, and rolling fine steel fibers may be designed and fabricated with the desired flow resistance. In such design and fabrication of the thin sheet metal, flow resistance varies approximately in proportion to the thickness of the final sheet, the square of the density, and inversely as the square of the fiber diameter or particle dimensions. Experiment has also shown that it is possible to obtain flow resistance above 15 rayls by perforating very thin sheet metal with a multiplicity of minute, closely spaced holes.

As shown in FIG. 1, the special exhaust duct 13 is operatively connected to the exhaust outlet 12 of the turbine and provided with a plurality of curves 14 throughout its length. The configuration of the duct 13 and curves 14 shown in FIG. 1 was determined by the space available in one particular application of the turbine 10. The curves shown are considered to be examples of gentle curves in an exhaust duct. It is important for the purposes of this invention to have at least one curve 14 in the duct, and a plurality of special vanes 15 are provided inside the conduit 13 extending throughout the length of the curve. Each vane is longitudinally curved parallel to the duct side walls and shaped to fit and be suitably secured in grooves formed in opposite walls of the duct 13 so as to provide a plurality of parallel passages 16 through which the vibrating exhaust gases pass. Thus, the plurality of vanes acts to distribute the exhaust gases throughout the width of the duct providing a controlled velocity profile and effectively preventing the entire exhaust stream from piling up on the concave wall of the duct as occurs when no vanes are employed. It has been found that the thin, slightly porous sheet metal, when backed up by the passages 16, effectively attenuates the noise of a gas turbine exhaust in accordance with the acoustical principles discussed above.

FIG. 2 shows one of the slightly porous sheet metal vanes prior to installation; and FIG. 3 illustrates the type of slight porosity obtained with the felted, sintered, and rolled steel fibers. In FIG. 4 a modified form of vane is shown as comprising a very thin metal sheet 17 having a multiplicity of minute openings or perforations 18 punched or otherwise suitably formed therein, the size of the openings being sufficiently small to produce the desired slight porosity as measured by a flow resistance above 15 rayls. To provide the necessary structural strength for such a vane, the thin metal sheet 17 may be backed up with a heavier plate 20 secured thereto with rivets 21 and having larger openings 22 behind the individual perforations 18 and substantially concentric therewith. The riveting of the heavier plate behind the thin sheet in this manner also acts to damp any vibrations that may occur in the thinner sheet as the sound waves are absorbed thereby. When this type of construction is used for a curved vane, the exposed smooth surface of the thin sheet 17 is placed on the concave side of the curve.

In FIG. 5 there is shown a slightly different configuration for a sound reducing exhaust duct 23 having curves 24 therein which are abrupt curves as compared with the gentle curves of FIG. 1. The curves 24 are shaped to turn the direction of the exhaust gases first in a complete reversal of 180° and then an additional 90° before the outlet. Vanes 25, similar in construction and function to the vanes 15, are provided in the duct and form passages 26 through which the gases pass. Depending upon the amount and shape of space available for the exhaust duct, the FIG. 5 form has been found to be effective in reducing all objectionable noise in the exhaust of a gas turbine.

It will be apparent that various minor changes may be made in the duct construction without departing from the invention or sacrificing any of its advantages.

I claim:

1. An exhaust duct for attenuating the sound of a gas turbine comprising: a conduit having a curve therein; and a curved vane in the curved portion of said conduit dividing said conduit into a plurality of substantially parallel passages, said vane being constructed of a thin sheet of slightly porous metal having a viscous flow resistance greater than 15 rayls.

2. An exhaust duct for gas turbines comprising: a conduit having a plurality of curved portions throughout the length thereof for repeatedly changing the direction of any gases flowing therethrough, and a plurality of curved, thin, slightly porous metal vanes in each of such curved portions of the conduit, the concave surfaces of said curved vanes being smooth and said slightly porous metal having a viscous flow resistance of between 15 and 300 rayls.

3. An exhaust duct for gas turbines to attenuate the sound of the exhaust of said turbine comprising: a conduit; a thin sheet of slightly porous metal having a viscous flow resistance of between 15 and 300 rayls disposed in said conduit shaped to fit in said exhaust duct and thereby divide said duct into a plurality of substantially parallel sound absorbing passages, said sheet being curved to provide surfaces to be successively impinged by the exhaust gases flowing through the conduit.

4. An exhaust duct for gas turbines to reduce the noise of the exhaust of such turbines comprising: a conduit; a thin sheet of metal having a multiplicity of perforations therein so as to provide a viscous flow resistance of between 15 and 300 rayls, and a backup plate of heavier metal attached to said thin sheet and having a multiplicity of openings therein concentric with but larger than said perforations, said combined thin sheet and backup plate being disposed in said conduit and being curved throughout the length thereof to provide surfaces to be successively impinged by gases flowing through said duct, said combined thin sheet and backup plate being shaped to fit in said exhaust duct and thereby divide said duct into a plurality of substantially parallel sound absorbing passages.

5. In a curved exhaust duct for a gas turbine which is adapted to burn liquid fuel, a fire-resistant sound attenuating means mounted in said duct and comprising: a plurality of curved vanes mounted in said duct, said vanes conforming to the curvature of said duct and dividing said duct into a plurality of sound attenuating passages, each of said vanes being constructed of a single thin sheet of slightly porous metal having a viscous flow resistance of between 15 and 300 rayls, the combination of thinness, curvature and flow resistance of said vane being such as to provide effective sound attenuation with a minimum of liquid fuel retention so as to render the sound attenuating means substantially fire-resistant.

6. An exhaust duct for attenuating the sound of a gas turbine, comprising: a conduit having a reverse curve therein; and a vane in said conduit conforming in curvature to the curved portion of said conduit and dividing said conduit into a plurality of substantially parallel curved passages, said vane being constructed of a thin sheet of slightly porous metal having a viscous resistance of about 100 rayls, the combination of thinness, curvature and flow resistance of said vane being such as to provide effective sound attenuation with a minimum of liquid fuel retention so as to render the sound attenuating duct substantially fire-resistant.

7. An exhaust duct for attenuating the sound of a gas turbine, comprising: a conduit having a plurality of arcuate sections with the centers of generation thereof on opposite sides of said conduit; and vane means disposed in said conduit, said vane means being substantially parallel with the conduit section walls and dividing the conduit into a plurality of passages each of which presents a plurality of oppositely facing surfaces to be successively engaged by sound waves flowing through said conduit, said vane means being constructed of thin single layer sheets of slightly porous metal having a predetermined viscous flow resistance and minimum liquid fuel retention characteristics, said vane means imposing a minimum aerodynamic penalty on exhaust gas flow through the conduit.

8. An exhaust duct for attenuating the sound of a gas turbine, comprising: a conduit; and a plurality of vane elements disposed in said conduit, said vane elements having a plurality of arcuate sections with the centers of generation thereof on opposite sides of said conduit, said vane elements being spaced from one another to provide a plurality of parallel reversely curved passages having oppositely facing curved surfaces spaced longitudinally of the conduit to be successively engaged by sound waves flowing through said conduit, said vane elements being constructed of thin single layer sheets of slightly porous metal having a predetermined viscous flow resistance and minimum liquid fuel retention characteristics, the thickness of said vane means imposing a minimum aerodynamic penalty on exhaust gas flow through the conduit.

References Cited by the Examiner

UNITED STATES PATENTS

| 1,844,104 | 2/32 | Schnell | 181—42 |
| 2,112,608 | 3/38 | Schmidt. | |
| 2,543,461 | 2/51 | Latulippe | 181—42 |
| 2,826,261 | 3/58 | Eckel | 181—33.22 |

FOREIGN PATENTS

| 416,278 | 9/34 | Great Britain. |
| 829,012 | 2/60 | Great Britain. |
| 54,338 | 6/48 | France. |

OTHER REFERENCES

Noise Control, vol. 2, No. 1, January, 1956, pages 15–19 and 72, "Porous Materials for Noise Control".

Steel, issue of Aug. 10, 1959, pages 126–128.

LEYLAND M. MARTIN, *Primary Examiner.*

C. W. ROBINSON, LEO SMILOW, *Examiners.*